Jan. 6, 1925. 1,522,218
L. W. WEBB
SHIP PROPULSION
Filed Oct. 11, 1923
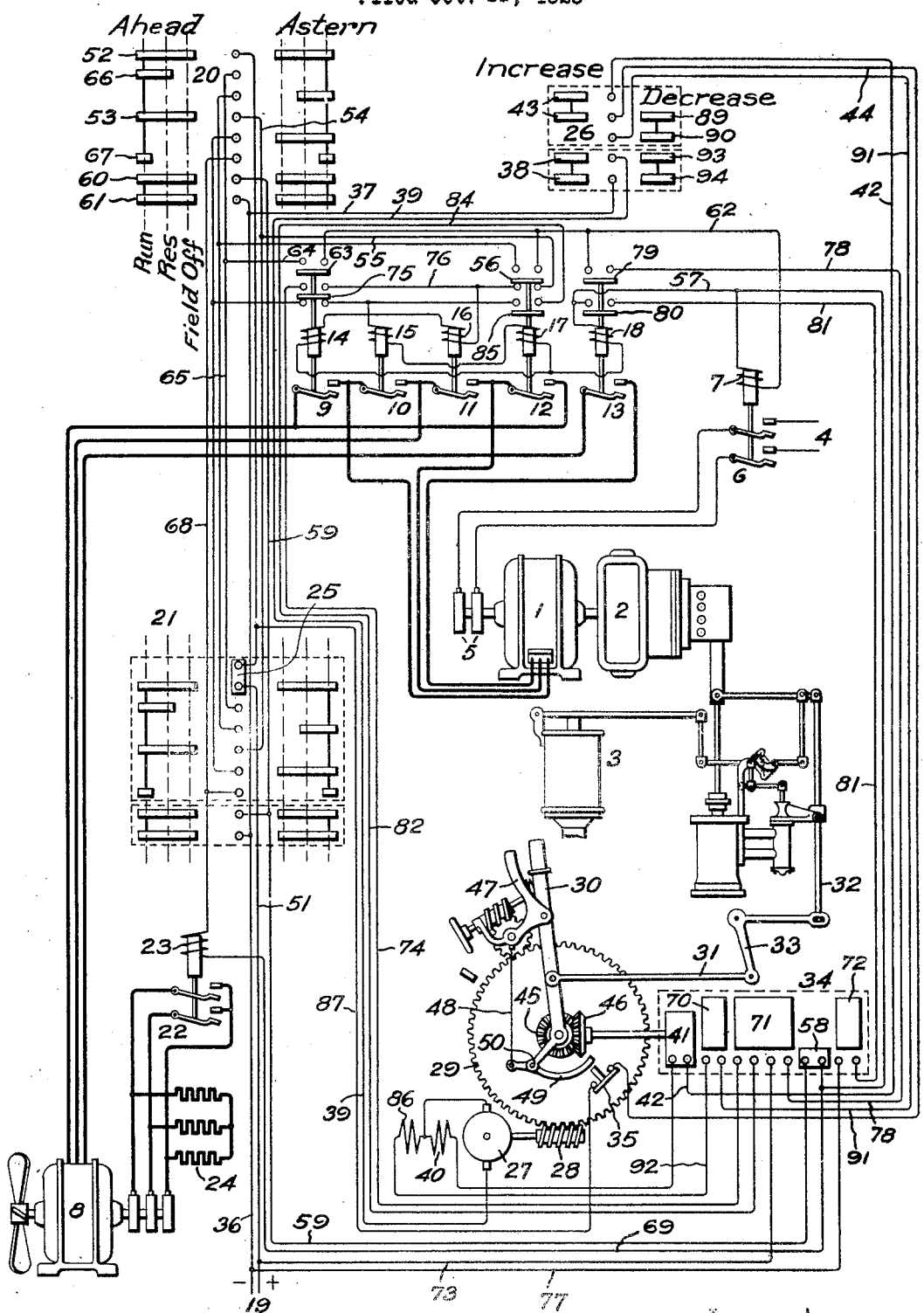
Inventor:
Lewis W. Webb.
by *Alexander F. ...*
His Attorney.

Patented Jan. 6, 1925.

1,522,218

UNITED STATES PATENT OFFICE.

LEWIS W. WEBB, OF SCHENECTADY, NEW YORK, ASSIGNOR TO GENERAL ELECTRIC COMPANY, A CORPORATION OF NEW YORK.

SHIP PROPULSION.

Application filed October 11, 1923. Serial No. 667,897.

*To all whom it may concern:*

Be it known that I, LEWIS W. WEBB, a citizen of the United States, residing at Schenectady, in the county of Schenectady, State of New York, have invented certain new and useful Improvements in Ship Propulsion, of which the following is a specification.

My invention relates to electric ship propulsion systems wherein the propeller motors are supplied with current from a turbo-generator or other suitable source of energy, and has for its object the provision of means whereby interruption and reversal of the propeller motor connections are prevented until the governor setting or speed of the generating means has been reduced to a safe value.

In the operation of ship propulsion systems it has been found desirable to avoid subjecting the reversing switches to the heavy duty and the propeller motors to the severe heating occasioned by reversal of the ship from full speed ahead without first reducing the speed and voltage of the generator or generators from which current for operating the propeller motors is supplied. In accordance with my invention the means by which the electrical connections of the system are controlled are so associated with the means for controlling the speed of the prime mover as to prevent a change in connections until the speed has been reduced to a predetermined value.

My invention will be better understood on reference to the following description when considered in connection with the accompanying drawing and its scope will be pointed out by the appended claims.

Referring now to the drawing there is shown in the single figure thereof a generator 1 driven by a prime mover illustrated as a steam turbine 2 provided with a governor 3 for regulating its speed. The field winding of the generator 1 is arranged to be connected with a source of excitation 4 through slip rings 5 and switch 6 provided with operating coil 7. Current from the generator 1 is supplied to the propeller motor 8 through reversing and disconnecting switches 9 to 13 inclusive which are provided with operating coils 14 to 18 the connections of which to a direct current source 19 are controlled by pilot house controller 20 and engine room controller 21. A switch 22 arranged to short-circuit the starting resistor 24 which is connected to the secondary winding of motor 8 is provided with an operating coil 23 also energized in response to movement of controllers 20 and 21. An interlock 25 is provided on the controller 21 for the purpose of robbing the controller 20 of control when the controller 21 is in other than its mid or off position.

A controller 26 is provided in the pilot house for controlling the setting of the turbine governor 3 with which it is associated through pilot motor 27, worm 28, gear 29, control lever 30 and rod 31 connected to the governor operating rod 32 through bellcrank 33. A follow-up device 34 operated in response to movement of the control lever 30 is provided for stopping the governor in extreme position and for establishing connections by which controllers 20 and 21 are robbed of control when the governor setting is such as to increase the steam admission beyond a certain predetermined value. The governor 3 may be set either in response to manipulation of the controller 26 or the lever 30. An interlock 35 responsive to movement of control lever 30 is arranged to disconnect the pilot motor 27 from the controller 26 which is thereby rendered inoperative to control the governor setting.

In operating the turbine 2 from rest, the steam is controlled by manual manipulation of the throttle until maneuvering speed of the turbo-generator has been attained. Maneuvering speed is about one-third full speed in the case of the induction motor and approximately one-fourth full speed in the case of the synchronous motor. The turbine 3 is arranged to control the steam admission at speeds in excess of the maneuvering speed.

To operate the turbine at speeds in excess of the maneuvering speed by pilot house control, the controller 26 is moved to the increase position and current is supplied to the pilot motor 27 from the source 19 through conductors 36 and 37, segments 38 of controller 26, conductor 39, pilot motor field 40, segment 41 of the follow-up device 34, conductor 42, segments 43 of the controller 26, conductor 44, interlock 35 and conductor 87. The pilot motor 27 thereupon operates through worm 28, gear 29, lever 30, rod 31 and bell-crank 33 to move the governor rod 32 in a direction to admit steam to the turbine and, unless the controller 26 is returned to mid or neutral position, will continue to increase the steam admission until maximum steam position is reached when the pilot motor 27 will be deenergized by disengagement of the segment 41 from its cooperating contacts due to continued rotation of the follow-up device 34 by the lever 30 with which it is mechanically connected through bevel gears 45 and 46. At any time during the acceleration of the turbo-generator set the controller 26 may be moved to mid or decrease position, thereby maintaining constant or decreasing the steam admission as may be desired. If desired the controller 26 may be robbed of control by manual operation of the lever 30 which may be disengaged from the gear 29 by compressing of the handle 47 arranged to operate the interlock 35 through rod 48 and lever 49 pivoted at the point 50. The interlock 35 is biased to closed position in any suitable manner.

With the generator operating and the pilot house controller 20 in mid or off position the motor 8 may be started from rest by movement of controller 20 in its "ahead" direction. Upon movement of this controller to its "Field off" position, switch operating coils 14, 16 and 18 are connected to the source of current 19 through conductor 51, segments 52 and 53 of the controller 20, conductors 54 and 55, interlock 56 on switch 12, conductor 57, segment 58 on follow-up device 34, conductor 59 and segments 60, 61 of controller 20 and conductor 36. Switches 9, 11 and 13 are thereupon closed and the motor 8 is connected to the generator 1 for operation in the ahead direction. Upon movement of the controller 20 to its "Res." position the generator field switch operating coil 7 is connected to the source 19 through conductor 36, segments 60 and 61 of controller 20, conductors 59, segment 58, conductors 57 and 62, interlock 63 on switch 9, conductors 64 and 65, segments 66 and 52 of controller 20 and conductor 51. The generator field switch 6 is thereupon closed and the motor 8 is operated with the starting resistor 24 connected in its secondary circuit. Upon movement of the controller 20 to its "Run" position the switch operating coil 23 of the resistor switch 22 is connected to the source of current 19 through conductor 51, segments 52 and 67 of controller 20, conductors 68 and 69, segment 58 of follow-up device 34, conductor 59, segments 60 and 61 and conductor 36. The switch 22 is thereupon closed to short-circuit the starting resistor and connect the motor 8 for normal operation.

Movement of the controller 20 in its "Astern" direction produces a sequence of operations identical with those just described except that switches 18, 17 and 15 are closed and the motor 8 is connected for operation in the reverse direction. It is believed that the connections by which this is accomplished will be readily understood without detailed description as will also the operation of engine room controller 21 which is like controller 20 except for interlock 25 the function of which has been previously explained.

Upon increasing the steam admission beyond a predetermined value the controllers 20 and 21 are rendered ineffective to control switches 6 and 9 to 13 inclusive. This is accomplished through segments 71 and 72 of the follow-up device 34 which, upon movement of the governor rod 32 to a predetermined position, energizes the switch operating coils 7 and 14 to 18 inclusive through circuits which are independent of the controllers. Thus, assuming the ship to be operating in the "Ahead" direction with a governor setting sufficiently high to bring the follow-up device segments 71 and 72 into engagement with their cooperating contact fingers, a holding circuit for switches 9, 11 and 13 is established through conductor 73, segment 71, conductor 74, interlock 75 on switch 9, conductor 76, interlock 80, conductor 81, segment 72 and conductor 77. Likewise the operating coil 7 of the field switch 6 is energized from the source of current 19 through conductor 73, segment 71, conductor 78, interlock 79 on the switch 13, conductors 62 and 57, interlock 80 on switch 13, conductor 81, segment 72, and conductor 77. Under these conditions the controllers 20 and 21 may therefore be moved to any position without affecting the operation of switches 6, 9, 11 and 13. During astern operation at or above a governor setting required to bring the segments 71 and 72 into engagement with their cooperating contact fingers a holding circuit for switch operating coils 10, 12 and 13 is established through conductor 73, segment 71, conductors 82 and 84, interlock 85 on switch 12, interlock 80 on switch 13, conductor 81, segment 72 and conductor 77.

The pilot motor 27 is provided with oppositely wound field winding 40 and 86. For operation of the governor in a direction to decrease the steam admission the pilot motor is connected to the source 19 through conductors 51 and 87, interlock 85, conductor 44, segments 89 and 90 of controller 26, conductor 91, segment 70, conductors 92 and 39, segments 93 and 94 of controller 26 and conductors 37 and 36. The handles of controllers 20 and 26 obviously may be mechanically interlocked if desired to prevent operation of the controller 20 while the controller 26 is in its increase position.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent, is:

1. An electric ship propulsion system wherein current is supplied to a propeller motor from a generator through switches operable in response to movement of a controller for controlling the connections between said motor and said generator and wherein said generator is driven by a prime mover having its speed controlled in response to the setting of speed control means, characterized by the fact that a follow-up device operatively associated with said speed control means is provided for rendering said controller ineffective to control the operation of said switches when said speed control means is set to increase the speed of said prime mover beyond a predetermined value.

2. An electric ship propulsion system wherein current is supplied to a propeller motor from a generator through switches operable in response to movement of a controller for controlling the connections between said motor and said generator and the field connections of said generator and wherein said generator is driven by a prime mover having its speed controlled by the setting of speed control means, comprising interlocking means associated with said switches, and a follow-up device operatively connected with said speed control means and arranged to cooperate with said interlocking means to form a holding circuit for said switches when said speed control means is set to increase the speed of said prime mover beyond a predetermined value.

3. An electric ship propulsion system wherein current is supplied to a propeller motor from a generator through switches operable in response to movement of a controller for controlling the connections between said motor and said generator and the field connections of said generator and wherein said generator is driven by a prime mover having its speed controlled by the setting of a governor, comprising a follow-up device operable in response to movement of said governor, an interlock associated with one of said switches and arranged to cooperate with said follow-up device in forming a holding circuit for the switches which control the connections between said motor and said generator, and a second interlock associated with one of said switches and arranged to cooperate with said follow-up device to form a holding circuit for the switch by which the field connections of said generator are controlled.

In witness whereof, I have hereunto set my hand this 9th day of October, 1923.

LEWIS W. WEBB.